Aug. 10, 1937.     G. MEYFARTH     2,089,397
INDIVIDUAL AXLE DRIVE FOR VEHICLES
Filed April 2, 1937
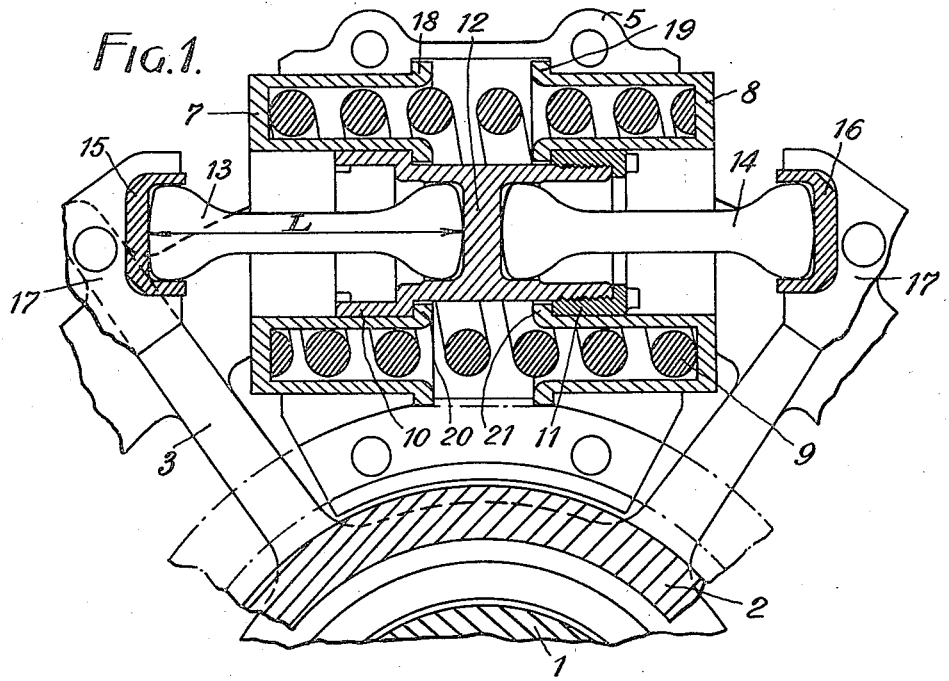
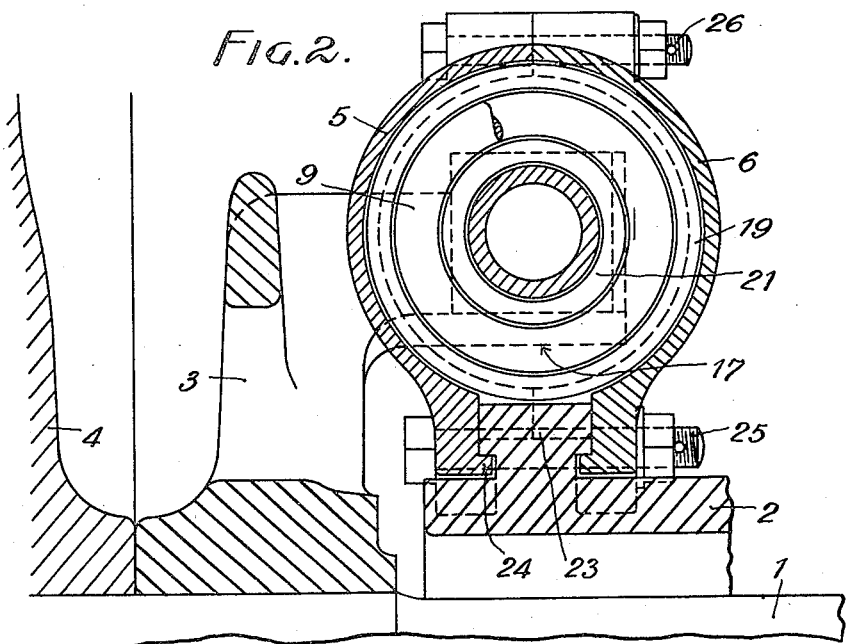

Patented Aug. 10, 1937

2,089,397

UNITED STATES PATENT OFFICE 2,089,397

INDIVIDUAL AXLE DRIVE FOR VEHICLES

Gottlieb Meyfarth, Secheron, Geneva, Switzerland, assignor of one-half to Société Anonyme des Ateliers de Sécheron, Secheron, Geneva, Switzerland, a corporation of Switzerland Application April 2, 1937, Serial No. 134,657
In Switzerland April 8, 1936

2 Claims. (Cl. 64—15)

The present invention relates to an individual axle drive for vehicles, comprising a spring coupling with a plurality of coupling elements, each of which comprises in combination a transmission device guided along its axis, an axially guiding coupling member, and a tangentially arranged coupling spring which is operative between the guiding member and the transmission device.

This invention has for its principal object to provide a plurality of coupling elements of very small dimensions considering the size of the coupling spring which they contain. The springs chosen to that effect are of the cylindrical helical type. They are inserted with preliminary tension in each element.

According to the invention, each spring of each element is inserted between two annular cup-like seating members which are axially guided in a frame forming part of one of the elements to be coupled; these cups in their turn, guide the organs which transmit the rotative momentum to the other of the elements to be coupled. The tension is transmitted preferably through flanges of the said cups.

The accompanying drawing shows by way of example the construction of coupling element according to the invention; Fig. 1 is an axial section thereof perpendicular to the axis of the axle; Fig. 2 is a transverse section thereof, parallel to the axis of the axle.

A motor, not shown, but situated in any of the usual ways above the axle 1 of the vehicle, drives the hollow shaft 2 and several elements like the one that is going to be described and by which the driving member 3 is driven. In 4 a wheel of the vehicle fixed on the axle 1 is to be found, the latter being connected with the member 3.

The element shown here, comprises a frame in two parts 5, 6, two cups 7, 8 inserted in that frame through which they are guided axially, that is to say, tangentially to the rotative direction of the element, and a spring 9 inserted with preliminary tension between the two cups in which it is partly lodged.

The cups 7 and 8 in their turn guide axially a core-piece in two parts 10 and 11 the second of which is screwed on the first. This core-piece is axially bored at its two extremities, but comprises in its center a partition 12 serving as support to the heads of two thrust plungers 13 and 14 of which the outwardly turned extremities end with heads resting in pans 15 and 16. These pans are placed in corresponding lodgings of arms 17 being parts of member 3.

Under pression of spring 2, the cups 7 and 8 have the tendency to separate the one from the other in the direction of their sliding, but they are stopped from doing so, on the one hand by circular outer flanges 18 and 19 respectively by which they stress on a corresponding stressing surface of frame 5, 6 and on the other hand, by inner circular flanges 20 and 21 respectively by which they stress on a corresponding stressing surface of the core-piece 10, 11.

The core-piece 10, 11 is thus axially guided by the two cups between which it is inserted in such a manner as not being able to effect any axial movement without driving one of these latter ones; this provokes naturally a corresponding compression of the spring 9. The frame 5, 6 being therefore the element driven by the motor, it transmits its movement in one or the other direction by one or the other of the flanges 18 and 19 to one of the cups 7 or 8 which, through its inner flange 20 or 21 drives the core-piece 10, 11.

The latter transmits the power to one of the pans 15 or 16 through the corresponding plunger 13 or 14; this provokes the driving of the member 3.

The heads of the plungers 13 and 14 being spherical and having a diameter equal to the length L of the latter, all the relative displacements between core-piece and pans are possible in a plan perpendicular to the tangential direction of the power transmission without producing friction or play between the organs, the plungers' heads rolling on their stressing surface.

As it is seen, the plungers penetrate into the spring, the cups permitting the spring to be disposed around said plungers and very nearly to the pans 15 and 16. The spring can therefore be very long considering the existing distance between the pans, permitting, according to a given spring, to construct an extremely short coupling element. This element shows on the other hand all the necessary qualities for an organ of this kind: the spring is guided here in such a manner that whatever the displacement between the elements to be coupled may be, it always works in its initial position submitted to no other deformation but to the compression in its axial direction.

The drawing shows equally an extremely simple manner of fixing a coupling element on the hollow shaft 2. The shaft comprises to that effect a circular T-shaped embossment 23 and the two parts 5 and 6 of the spring housing bear corresponding jaws 24 which can be inserted under the head of the circular embossment. Screws 25 piercing at the same time the jaws 24 and the embossment 23 permit to proceed simultaneously to the connecting of the parts 5 and 6 and to their fixing to the hollow shaft 2. Other screws 26 complete the mounting operation.

What I claim is:—

1. An individual axle drive for vehicles, comprising a spring coupling with a plurality of coupling elements, each of which comprises in combination an axially guiding coupling member, two annular cup-like seating members guided tangentially by said guiding member, a cylindrical helical spring inserted in said annular cups, a core-piece situated in the interior of the cups and tangentially guided by the latter ones, transmission means tangentially interposed between this core-piece and corresponding abutments, means being provided limiting the axial displacement of the cups in the guiding member and of the core-piece in the cups.

2. An individual axle drive for vehicles, comprising a spring coupling with a plurality of coupling elements, each of which comprises in combination an axially guiding coupling member, two annular cup-like seating members guided tangentially by said guiding member, said cups stress against the guiding member by means of outer circular flanges, a cylindrical helical spring inserted in said cups, a core-piece situated in the interior of the cups and guided tangentially by the latter between inner circular flanges, and transmission means partially surrounded by the spring and the cups and tangentially interposed between the core-piece and corresponding abutments.

GOTTLIEB MEYFARTH.